(No Model.)

J. T. TOWSLEY.
GLUE HEATER.

No. 553,946. Patented Feb. 4, 1896.

WITNESSES.
Howard H. Ralston
Emma Lyford

INVENTOR.
John T. Towsley
By Geo. J. Murray
Atty.

UNITED STATES PATENT OFFICE.

JOHN T. TOWSLEY, OF CINCINNATI, OHIO.

GLUE-HEATER.

SPECIFICATION forming part of Letters Patent No. 553,946, dated February 4, 1896.

Application filed April 15, 1895. Serial No. 545,729. (No model.)

*To all whom it may concern:*

Be it known that I, JOHN T. TOWSLEY, a citizen of the United States, and a resident of Cincinnati, in the county of Hamilton and State of Ohio, have invented certain new and useful Improvements in Glue-Heaters, of which the following is a specification.

My invention relates to that class of glue-heaters in which the water-kettle containing within it the customary glue-pot is adjusted nearer to or farther from a steam-heated surface for the purpose of regulating the heat of the water contained within the kettle to keep the glue at the desired temperature.

The invention consists in the peculiar combination and arrangement of parts illustrated in the accompanying drawings, in connection with which the invention will be first fully described and then particularly referred to and pointed out in the claims.

Figure 1:
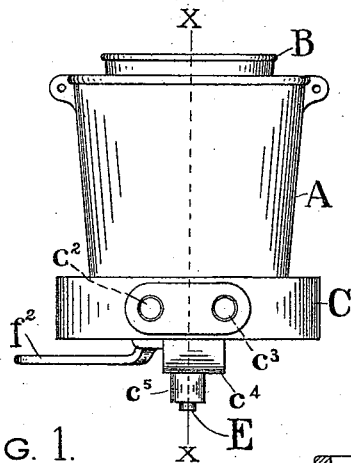
Figure 2:
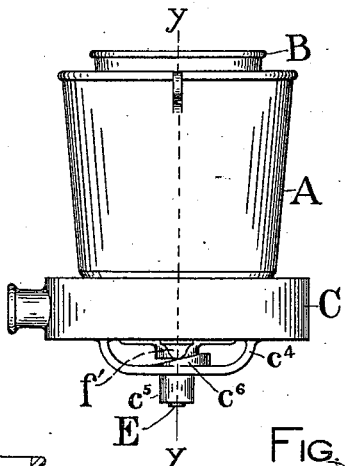
Figure 3:
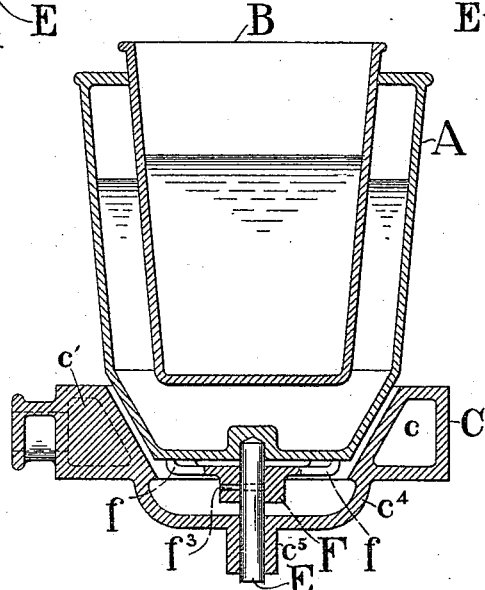
Figure 6:
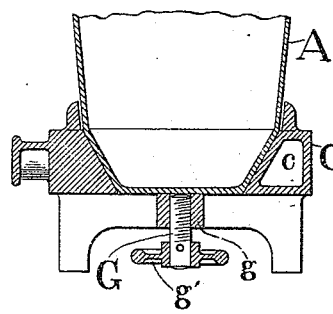
Figure 4:
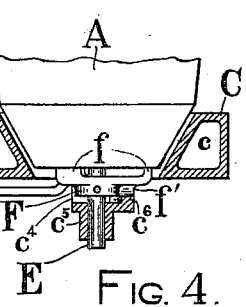
Figure 5:
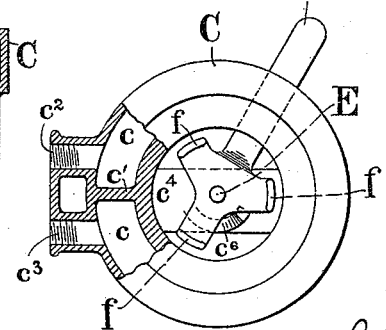

Figure 1 is a front elevation of my improved device, with the water-kettle resting directly upon the heater. Fig. 2 is a side elevation of the same, with the water-kettle elevated to remove it out of contact with the heater. Fig. 3 is an axial section of the same, upon an enlarged scale, taken through line $xx$ of Fig. 1, but with the parts in the position shown in Fig. 2. Fig. 4 is an axial sectional view taken through line $yy$ of Fig. 2. Fig. 5 is a plan view of the heater, the kettle being removed and a portion of the heater-top broken away, showing part of the steam-chamber in transverse or horizontal section. Fig. 6 is a diametrical sectional view illustrating a modified form of my invention.

Referring to the parts by reference-letters, A represents the water-kettle having seated within it the customary glue pail or pot B; C, the heater, which is circular in form and preferably made of cast metal, having a steam-chamber $c$, formed by core in casting, the chamber being divided by a partition $c'$ and having branches $c^2$ and $c^3$ leading into the chamber upon opposite sides of the partition, the one to be connected to the induction and the other to the eduction pipe for conveying the steam around the chamber. The inner wall of the chamber is inclined counter to the inclined or cone-shaped lower side walls of the water-kettle A, in order that the inclined wall of the water-kettle may be brought in contact with the inclined inner wall of the heater when it is desirable to heat the water in the kettle A to the boiling-point.

I have provided means to bring the inclined lower wall of the kettle in contact with the heater when a high temperature is desired and to throw the kettle up, leaving a space between the inclined wall of the heater and the bottom of the kettle when a lower temperature is desired.

I have formed integral with the heater C a yoke $c^4$, extending from the bottom of the heater and terminating centrally in a perforated boss $c^5$ to receive a stud-pin E, which extends through the boss and into a depression in the bottom of the kettle A. The yoke $c^4$ has formed upon its upper surface an annular incline $c^6$, and upon a pin E within the yoke is secured a collar F, which has projecting up from it three arms or branches $f$ upon which the bottom of the vessel A rests. The collar F has projecting down from it a lug $f'$ to bear upon the incline $c^6$ of the yoke. It has also extending laterally from it a lever-arm $f^2$ in convenient position to be handled by the operator, so that by turning the lever in one direction the inclined bottom of the kettle is brought in contact with the heater, and by turning it in the opposite direction it is thrown out of contact, as seen clearly in Figs. 3 and 4. The collar F is locked upon the steady-pin E by a pin $f^3$ passing through the collar and into the pin. The main purpose of the pin $f^3$ is to prevent the guide-pin from dropping out.

In the modification shown in Fig. 6 I have illustrated a screw G, tapped through a boss $g$, formed integral with the heater C and a hand-wheel $g'$, secured upon said screw to elevate or lower the kettle A to throw it out of or bring it in contact with the heater for the purpose of highly heating the kettle A when brought in contact with the heater C or modifying the heat of the vessel A by moving it a greater or less distance away from the heater C.

In my preferred form of glue-heater I have shown no means for supporting the heater above the work-table, as in practice the work-table is ordinarily arranged along the wall of the building and the steam-pipes supplying the heaters C are connected by the customary staples or clips to the wall of the building, and when the heaters C are connected to the branches from these pipes the pipes themselves support the heater above the table; but if desirable (and it would be only desirable when the kettle A and glue-pail B are larger than usually employed) the heater C may be rigidly supported above the table by a spider of ordinary construction or ordinary legs secured to the under side of the heater opposite the pipe connections, as indicated in dotted line, Fig. 3.

The broad idea of arranging a water-kettle carrying a glue-pail so that it may be brought in actual contact with a steam-heater or removed from the heater, so as to allow air to circulate between the heater and base of the kettle, is not new with me, and I am not entitled to any broad claim for such construction; but prior to my invention I believe no convenient and practical means has been used or suggested for conveniently and positively adjusting the kettle with relation to the heating-surface by which the glue may be maintained at any desired temperature without inconvenience to the workman.

What I claim as new, and desire to secure by Letters Patent, is—

1. The combination, substantially as hereinbefore set forth, of the steam-heater consisting of an annular chambered ring, the inner wall of which is inclined, said ring having a yoke carrying a central boss formed integral with it, a water-kettle having its bottom inclined counter to the inclined surface of the heater, a glue-pail fitted within said water-kettle and means, substantially as shown, to elevate or lower the water-kettle for the purpose of bringing it into or out of contact with the heater.

2. In a glue-heater, the combination of the annular chambered ring heater, said ring having its inner wall inclined and having a yoke or support formed integral with it extending diametrically across its central opening and provided with a central perforated boss, an incline on the upper face of said yoke around the boss, a water-kettle having its lower end cone-shaped counter to the inclined inner face of the ring heater, the collar having upwardly-projecting arms to bear upon the bottom of the water-kettle, and a downwardly-projecting lug to rest upon the incline upon said yoke, a journal-pin passing through the boss of the yoke, a collar bearing upon the bottom of the kettle and secured to the pin, and an arm extending from said collar whereby the kettle is elevated above or brought in contact with the heater by turning said arm in one or the other direction, substantially as shown and described.

3. In a glue-heater, the combination of the heater, C, having its inner walls inclined, and having formed integral with it a diametrical yoke having a central perforated boss depending from it and an incline at its upper face, the water-kettle, A, having its lower end cone-shaped counter to the inner wall of the heater and its bottom countersunk to receive a central journal-pin, E, the collar, F, coupled to the journal-pin, having upwardly-extending branches, $f$, to bear against the bottom of the water-vessel and a lever-arm, $f^2$, extending beyond the heater, whereby the kettle, A, may be elevated or lowered to bring it nearer to or farther from the heater for the purpose of regulating the temperature of the glue, substantially as shown and described.

JOHN T. TOWSLEY.

Witnesses:
HOWARD H. RALSTON,
GEO. J. MURRAY.